United States Patent
Green et al.

(10) Patent No.: US 6,571,645 B1
(45) Date of Patent: Jun. 3, 2003

(54) DIFFERENTIAL PRESSURE VELOCIMETER WITH PROBE BODY HAVING DISK SHAPE

(76) Inventors: Sheldon I. Green, #313 - 1424 Walnut Street, Vancouver, B.C. (CA), V6J 3R3; Steven N Rogak, 875 East 30$^{th}$ Street, Vancouver, B.C. (CA), V5V 2W2

( * ) Notice: Subject to any disclaimer, the term of this patent is extended or adjusted under 35 U.S.C. 154(b) by 0 days.

(21) Appl. No.: 10/018,385
(22) PCT Filed: Jun. 1, 2000
(86) PCT No.: PCT/CA00/00652
  § 371 (c)(1),
  (2), (4) Date: Nov. 27, 2001
(87) PCT Pub. No.: WO00/75674
  PCT Pub. Date: Dec. 14, 2000

Related U.S. Application Data
(60) Provisional application No. 60/137,512, filed on Jun. 2, 1999.

(51) Int. Cl.$^7$ ................................................. G01F 1/37
(52) U.S. Cl. ................................................. 73/861.52
(58) Field of Search ........................ 73/861.52, 861.55, 73/861.66, 861.65, 861.61, 861.42, 861.28, 715, 716, 866.5

(56) References Cited

U.S. PATENT DOCUMENTS

| | | | |
|---|---|---|---|
| 4,825,704 A | | 5/1989 | Aoshima et al. |
| 4,920,808 A | | 5/1990 | Sommer |
| 5,465,626 A | * | 11/1995 | Brown et al. .................. 73/715 |
| 6,343,511 B1 | * | 2/2002 | Lynnworth et al. ...... 73/861.18 |

FOREIGN PATENT DOCUMENTS

WO  WO 91/03739  3/1991

OTHER PUBLICATIONS

Modelling Calibration & ERROR Analysis of seven–hole pressure probes G G Zilliac Experiments in Fluids 14, 104–120 1993.
Particle image velocimetry : a review—I Grant Proc Instn Mech Engrs vol. 211 Part C 1997.
Development of a Nearly Omnidirectional Velocity Measurement Pressure Probe—Rediniotis & Kinser—AIAA Journal vol. 36 No. 10 Oct. 1998.
Seven–Hole Conel Probes for High Angle Flow Measurement: Theory & Calibration Everett et al. AIAA Journal vol. 21 No. 7 Jul. 1983.
Cup, Propeller, Vane and Sonic Anemometers in Turbulence Research Wyngaard Annual Review Fluid Mechanics 1981 13:399–423.
Pressure Probe for Fluid Measurement—Chue Progress Aerospace Sci. 1975 vol. 16 No. 2 pp. 147–223.

* cited by examiner

Primary Examiner—Hezron Williams
Assistant Examiner—Takisha S Miller
(74) Attorney, Agent, or Firm—C. A. Rowley

(57) ABSTRACT

A disk probe velocimeter is formed by multiple orthogonal disks fitted with pressure transducers positioned to measure dynamic pressure differences between the center of one disk face and the center of the other face of each disk. The velocimeter can measure reasonably accurately three components of velocity where the approximate direction of the flow is not known. Where the dominant velocity component is known, the velocimeter may be combined with a Pitot probe to form a compact anemometer.

21 Claims, 18 Drawing Sheets

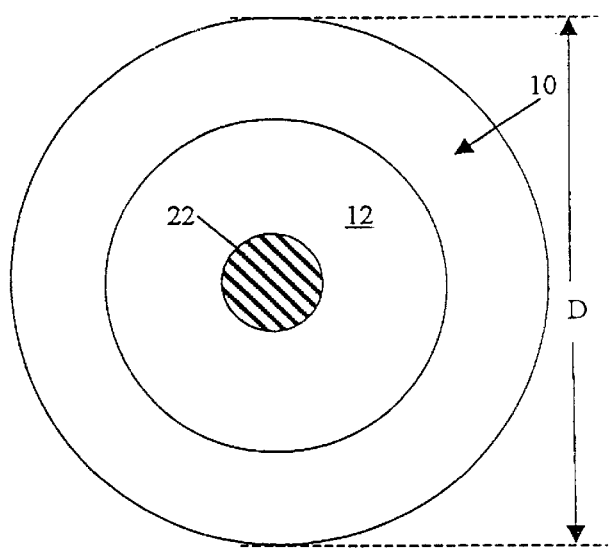
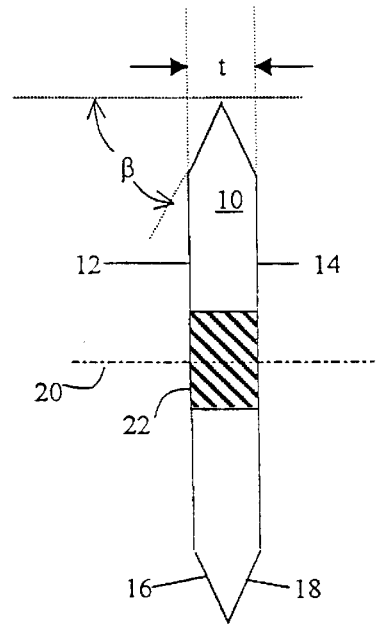
Fig. 1
Fig. 2
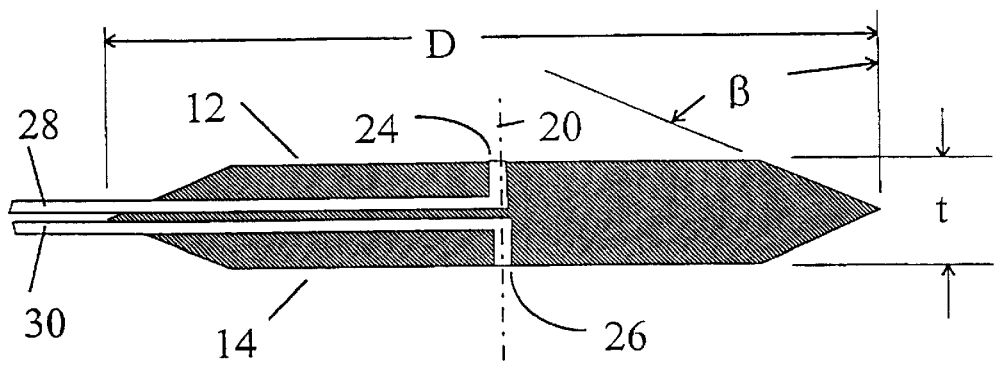
Figure 3

DIFFERENTIAL PRESSURE VELOCIMETER WITH PROBE BODY HAVING DISK SHAPE

CROSS-REFERENCES TO RELATED APPLICATIONS

The benefit under Title 35 United States Code §119(e) based on U.S. Provisional application No. 60/137,512 field Jun. 2, 1999 is claimed.

Foreign priority is claimed under Title 35 United States Code §119(a) (d) or §365 (b) based on PCT application no PCT/CA00/00652.

FIELD OF THE INVENTION

The present invention relates to a velocimeter, more particularly the present invention relates to a velocimeter made of discrete disk probes.

BACKGROUND OF THE INVENTION

Present methods for measuring multiple components of velocity can be divided into two broad classes: accurate, expensive, laboratory-type instruments, and robust (but less accurate), inexpensive, instruments.

Into the first class would fall devices such as hot wire anemometers see for example, Comte-Bellot, G. 1976: Hot wire anemometry. *Annual Review of Fluid Mechanics* Vol. 8, 209–231; or Perry, E. 1982: Hot wire anemometry. Oxford: Clarendon Press: laser Doppler velocimeters, see for example, Drain, L. E. 1980: The Laser Doppler technique. New York: Wiley or Drain, L. E. 1980: The Laser Doppler technique. New York: Wiley: or particle image velocimeters see for example, Adrian, R. J. 1991: Particle imaging techniques for experimental fluid mechanics. *Annual Review of Fluid Mechanics* Vol. 23, 261–304 or Grant, 1. 1997: Particle image velocimetry: A review. *Journal of Mechanical Engineering Science* 211, 55–76, and a host of others. These devices are characterized by excellent accuracy (typically, velocities can be measured to within 1%) but high cost ($10 k–$100 k+) and comparatively poor durability. Their high cost and poor durability in general limit these devices to use in a controlled environment like a laboratory; they are rarely used in an industrial or field work setting.

The class of robust, inexpensive instruments would include cup, propeller, and vane anemometers see Wyngaard, J. C. 1981: Cup, propeller, vane, and sonic anemometers in turbulence research. *Annual Review of Fluid Mechanics* Vol. 13, 399–423: claw probes, yaw head probes, and five-hole and seven-hole probes, see for example, Wyngaard, J. C. 1981: Cup, propeller, vane, and sonic anemometers in turbulence research *Annual Review of Fluid Mechanics* Vol.13, 399–423; Chue, S. H. 1975: Pressure probes for fluid measurement. *Progress in Aerospace Science* Vol.16, 147–223; Zilliac, G. G. 1993: Modelling, calibration, and error analysis of seven hole pressure probes. *Experiments in Fluids* Vol. 14, 104–120; and Everett, K. N., Gerner, A. A., and Durston, D. A. 1983: Seven-hole cone probes for high angle flow measurement: theory and calibration. *AIAA Journal* Vol. 21, 992. In general, these devices are reliable and reasonably accurate (directions to ±1° and velocities to ±1%), but can accurately measure only mean flow velocities within ±70° of a known flow direction (see Chue and Zilliac referred to above).

Recently, Rediniotis and Kinser (see Rediniotis, O. K. and Kinser, R. E. 1998: Development of a nearly omnidirectional velocity measurement pressure probe. *AIAA Journal* Vol. 36, 1854–1860) have developed a probe using 18 holes over the surface of a sphere. Although this probe is nearly omni-directional (cone angles >90 degrees), and is apparently accurate for the reported conditions, it should be noted that calibration of this device is complex due to the large number of pressure taps and the complex flow regimes around a sphere that occur at various Reynolds numbers.

International Application no WO 91/03739 published Mar. 21, 1991 discloses a flow speed meter for channels or tunnels that uses a plate oriented with its major side surfaces perpendicular to the direction of flow and measures the differential pressure between opposite sides to determine the flow velocity.

To the Applicants' knowledge, prior to the present invention no device was available that will robustly and economically measure velocities particularly 2 dimensional (2D) and 3 dimensional (3D) velocities in highly 2D or 3D flow.

BRIEF DESCRIPTION OF THE PRESENT INVENTION

It is an object of the invention to provide a disk probe for measuring fluid flow velocities. It is a further object of the invention to provide a multiple disk probe capable of robustly and economically measuring velocities, particularly 3D velocities in highly 3D flow.

Broadly, the present invention relates to a device for measuring fluid flow comprising a substantially circular disk having a pair of opposed substantially parallel side faces, pressure sensor means at the center of each of said pair of faces to sense pressure at said center of each said face thereby to provide a substantially symmetrical disk probe.

Preferably said outer faces are connected together at their outer peripheries by a beveled edge symmetrical relative to said pair of faces.

Preferably said disk has a diameter D greater than 3 mm and preferably between 3 to 40 mm.

Preferably said disk has a thickness t measured between said parallel faces of t less than ½ the diameter D of said disk.

Preferably said beveled edge is defined by bevel surfaces extending at bevel angle β in the range of 45 to 80°.

Preferably said pressure sensor means comprises a pressure transducer for sensing pressure difference between said centers of said pair of faces.

Preferably said pressure sensor comprises a pair of pressure taps positioned at said center of each of said pair of faces.

Preferably said device comprises a plurality of said disks arranged with said pair of faces of each of said disks orthogonal to said pair of faces of other disks of said plurality of disks.

Preferably said device comprises two said disks.

Preferably said device comprises three said disks.

Preferably said device includes a pressure transducer for each said disk and a computer programmed to compute velocity and direction of flow of said fluid.

Preferably said device comprises a pair of said orthogonal disks arranged in orthogonal relationship with the axis of a pitot-static probe.

BRIEF DESCRIPTION OF THE DRAWINGS

Further features, objects and advantages will be evident from the following description of the preferred embodiment of the present invention taken in conjunction with the accompanying drawings in which:

FIG. 1 is a schematic face on view of a disk for use in the present invention

FIG. 2 is a schematic edge view (taken perpendicular to FIG. 1) of the disk of FIG. 1.

FIG. 3 is a cross section through a disk similar to FIG. 1 and 2, but provided with pressure taps to sense the pressure at the center of each face of the disk, tap lines are recessed in the disk surface and faired flush with the surfaces.

DESCRIPTION OF THE PREFERRED EMBODIMENTS

Figure 4:
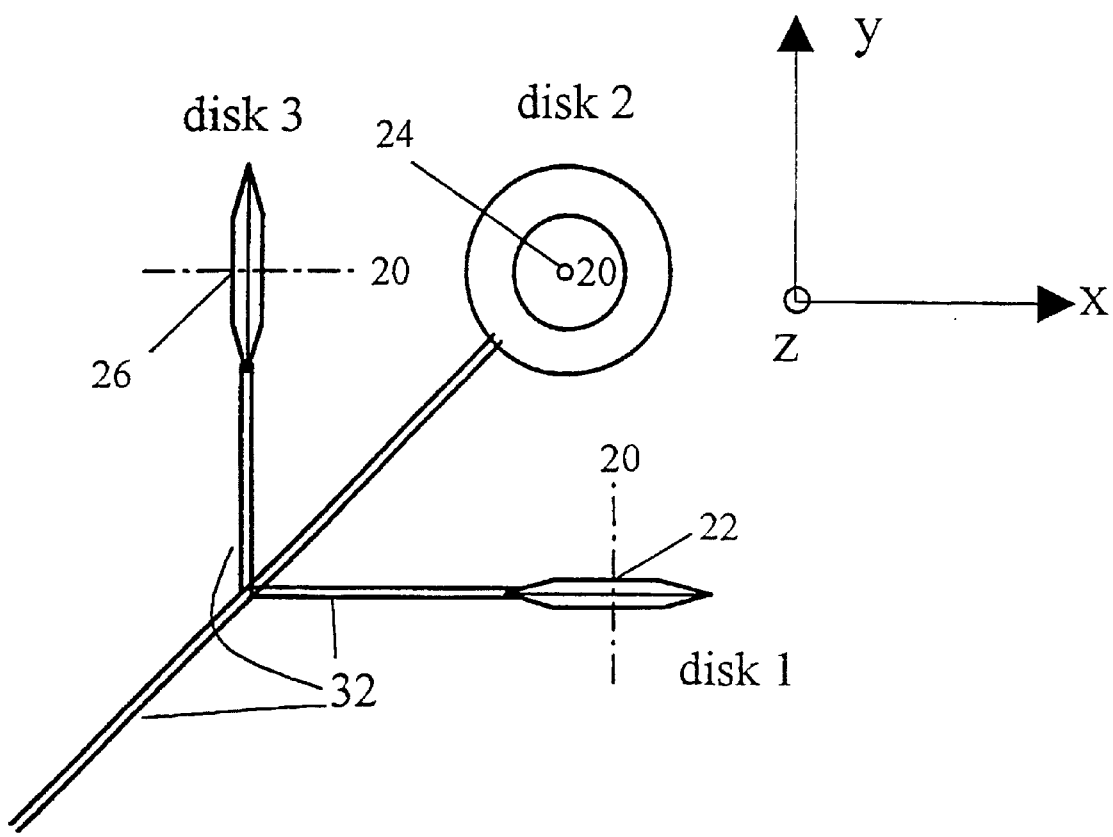
FIG. 4 is a schematic illustration of a multiple disk probe disk probe for 2 or 3-dimensional velocity measurements.

As show in FIGS. 1 and 2 each disk 10 used to form the disk probe of the present invention is a substantially circular disk 10 of a diameter D and having a pair of opposed substantially parallel faces 12 and 14 interconnected around the periphery of the disk 10 by a pair of beveled surfaces 16 and 18 symmetrical with the central axis 20 of the circular disk 10. The disk bevel angle is indicated as angle P and is the bevel angle P of each of the surfaces 16 and 18 to their respective faces 12 and 14. The disk has a thickness i.e. spacing between the surfaces 12 and 14 designated as t.

Probe configurations other than circular may be used, for example the disks 10 could be elliptical or even octagonal, provided that they are approximately axisymmetric. By approximately axisymmetric, we mean that the disks have a mean standard deviation of the radius, measured around the circumference of less than 10% of the radius. The term "substantially circular" as used in the disclosure and claims is intended to include the above-defined configurations.

Smaller diameter disks are better. There is a fundamental lower bound on the diameter, which is the requirement that the flow over the disk separate from the disk edge, which will occur for a flow Reynolds number greater than about 100. With a very modest airflow velocity of 1 m/s, this Reynolds number is achieved with a disk diameter of 2 mm (about 1/16 inch). There appears to be no theoretical upper bound on disk diameter (although larger disks have no obvious advantages). A lower boundary of disk diameter of 2 mm may not be practical as such a disk would be under a millimeter in thickness i.e. t would be less than a millimeter, and would be very difficult to support rigidly. The preferred disk diameter is in the range from about 3 mm to 40 mm and the thickness t will be at least 1 mm and preferably between 2 and 2 mm.

The use of a bevel angle $\beta$ is not essential, but it is preferable to bevel the edge at a bevel angle $\beta$ in the range of 45 to 80°.

The probe thickness t need not be uniform, but should not be so non-uniform as to cause the disk faces to differ from parallel by more than 5 degrees. In the preferred configuration of the disks, the sides are within 1 degree of parallel, but non-parallelism of up to 5 degrees could be tolerated without substantial diminution of the accuracy of the device.

The surfaces of the disk need not be smooth, although neither is there an obvious advantage to having non-smooth disks. In the preferred configuration, the surface undulations, if present, should be limited to not more than 20% of the mean thickness t, and ideally should be less than 5% of t.

When multiple disks are used for multi-component velocimetry, the disks should be placed sufficiently far from one another that their hydrodynamic influence on one another is sufficiently small. A disk spacing L (see FIG. 7) of at least 2 diameters is necessary for this purpose, and one of greater than 4 diameters would be more suitable for best accuracy.

The maximum spacing between disks is a function of the spatial non-uniformity of the flow. The smallest flow structures that one can measure accurately with the device are approximately the size of the disk spacing L. For disks 7 cm apart, for example, it is therefore not possible to measure accurately flow structures smaller than 7 cm. For the above reasons, in most applications the preferred configuration of a multiple disk probe has disks spaced between 3 and 7 diameters apart.

Positioned substantially at the center 20 of each face 12 and 14 of the disk 10 is a pressure sensor schematically indicated as 22. These pressure sensors may be any suitable form of pressure transducer capable of determining with the desired degree of accuracy the pressure at the center 20 of each face 12 and 14 or the pressure difference between these centers 20.

The pressure sensors or transducers need not be located exactly at the disk center, but it is important that the pressure sensors or transducers be mounted substantially flush relative to both faces 12 and 14 of the disk 10.

In the preferred configuration of the device, the central pressure port or sensor 22 is within manufacturing tolerances of the exact center 20 of the disk. However, even if the central pressure ports 22 are displaced by 10% of the disk diameter from the center 20, the device should still function reasonably well.

In the specific arrangement shown in FIG. 3 the pressure sensor(s) 22 is (are) formed by pressure taps 24 and 26 that are provide at the center 20 of the faces 12 and 14 respectively and are connected via lines 28 and 30 respectively to a suitable pressure transducer to determine the pressure at the center of each of the faces 12 and 14.

FIG. 4 shows schematically the arrangement of the disks 10 of a three (or two) disk probe device of the present invention. As illustration, 3 disks 10 designated as disks 1, 2 and 3 in FIG. 4 are arranged in mutually orthogonal relationship i.e. in the illustrated arrangement the disk 1 has its axis 20 aligned with say a y axis, disk 2 with it axis on a z axis (i.e. into the paper) and disk3 with its axis 20 on a x axis. Generally for convenience in a given installation these disks 1, 2, and 3 will be essentially the same size and shape, however this is not essential.

In a multiple disk configuration, the disks need not be precisely orthogonal. In fact, even if the disks are substantially non-orthogonal (e.g. 30 degrees from perpendicular), it would nonetheless be possible to calibrate the device to give accurate velocity readings. However, the algorithm required to do such a calibration is significantly more complex than if the disks are nearly orthogonal. For this reason, the preferred embodiment of a multiple disk probe would consist of disks within 5 degrees of perfect orthogonality.

Each of the disks 1, 2 and 3 is supported in space by suitable rods or the like generally indicated at 32. These rods or the like 32 support the disks 1, 2 and 3 and contain the lines for connecting the pressure sensors to the remainder of the instrumentation and computer system. As will be described below the pressure difference $\Delta p$ between the centers of opposite faces 12 and 14 of each of the disks 1, 2 and 3 is determined.

Figure 5:
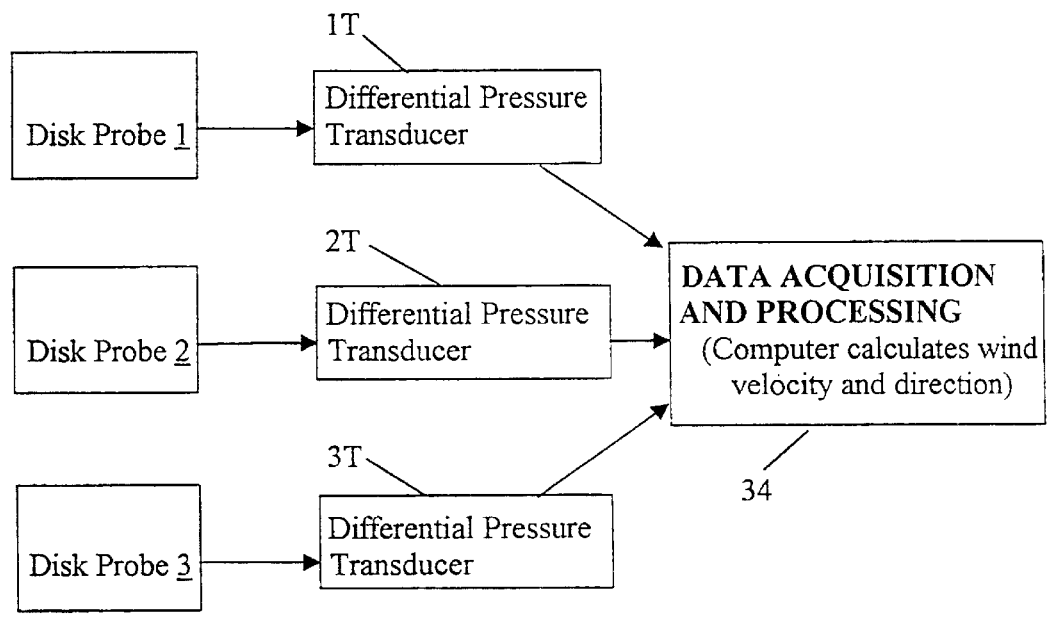
FIG. 5 is a schematic illustration of a data acquisition and processing system suitable for the present invention FIG. 6 schematically indicates the geometry of a single disk and the velocity vector of the fluid.

The output of each of the pressure sensors 22 or 24 and 26 of each of the disks 1, 2 and 3 are delivered to its respective differential pressure 1T, 2T and 3T if required (see FIG. 5) to determine $\Delta p$ for each of the disks 1, 2 and 3 respectively and this information is provided to a data acquisition and processing station 34 the velocity and direction of the fluid flow (wind) is determined as will be described below.

Heaters (not shown) could be included in the structure of the disk 10 and used to help to prevent ice buildup and non-wetting coatings could be used to repel water droplet formation in the pressure port. The periodic application of a high pressure pulse of air (not shown) to clear the pressure tap lines, such as is often done in other pressure measuring situations, could be readily incorporated in the design.

The multiple disk probe described here is capable of robustly and economically measuring velocities, particularly 3D velocities in highly 3D flow. The invention has obvious applications in meteorological stations (particularly in a harsh marine environment), in structural aerodynamics, and in industrial aerodynamics.

THEORY OF OPERATION OF A MULTIPLE DISK PROBE

A multiple disk probe consists of two or three orthogonal circular disks, situated fairly closely together in space. As above described each disk is fitted with a pressure transducer, or pressure tap lines, to measure the pressure difference from the center of one side of the disk to the center of the opposite side. Neglecting the (small) effect of fixtures required to hold the disks in place (rods 32), the pressure difference between one side 12 of the disk 10 and the other side 14 must be a function solely of the disk geometry, the properties of the fluid (air), the magnitude of the velocity, and the angle made by the velocity vector relative to the normal vector to the disk. Most significantly, owing to the symmetry of the disk geometry, the pressure difference cannot be a function of the azimuthal orientation $\phi$ of the velocity vector Vv. Due to symmetry, $\Delta p$ is not a function of the azimuthal angle $\phi$.

Figure 6:
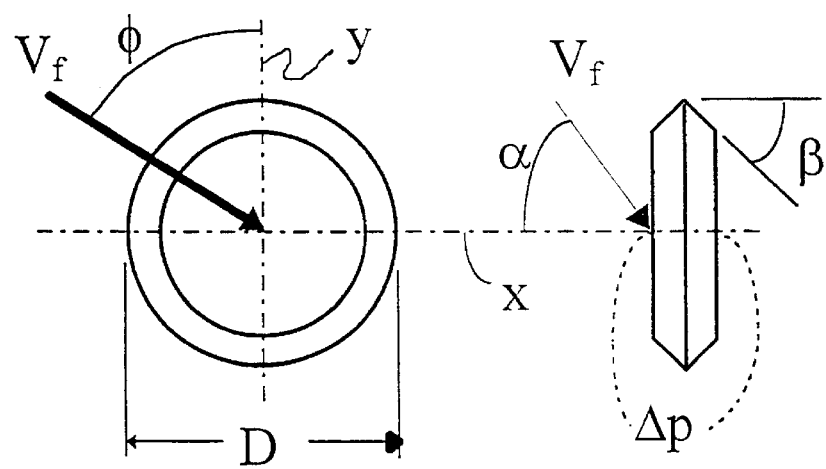

In the illustration used for explanation (FIG. 6 and 7) angle $\alpha$ designates the angle of vector Vv to the x axis.

Figure 7:
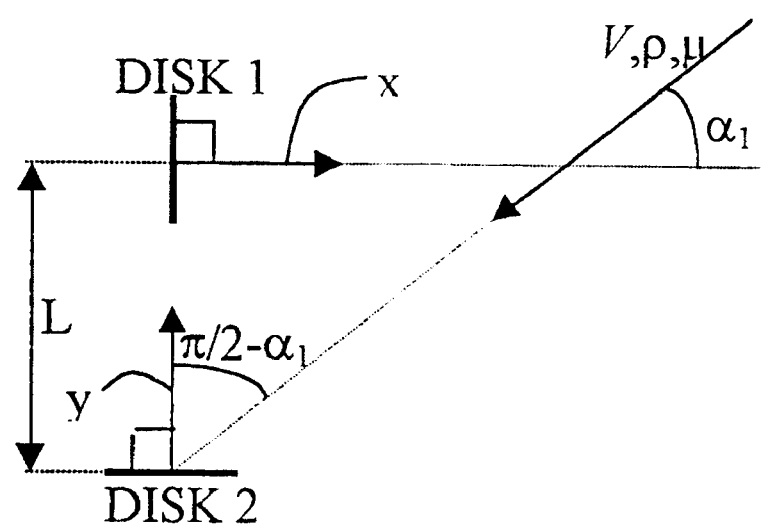
FIG. 7 illustrates the vectors for determination of 2D velocity using 2 disks.

The principle of operation of a multiple disk probe is best understood by considering a purely two-dimensional flow (FIG. 7). The disk normals are parallel with the x and y axes.

Qualitatively, if $0<\alpha_1<\pi/2$, then $(\Delta p)_1$ is positive and so is $(\Delta p)_2$. For $\pi/2<\alpha_1<\pi$, $(\Delta p)_1$ is negative and $(\Delta p)_2$ is positive. Similarly, for $\pi<\alpha_1<3\pi/2$, $(\Delta p)_2$ is negative and so is $(\Delta p)_2$. Finally, for $3\pi/2<\alpha_1<2\pi$, $(\Delta p)_1$ is positive and $(\Delta p)_2$ is negative. Therefore, it is trivial to distinguish the quadrant of the flow direction. Determining the exact angle of the flow is slightly more involved.

In view of the physical argument made above, the pressure difference across Disk 1, $(\Delta p)_1$, is a function of just the disk geometry (which can be characterized by the disk diameter, D) the magnitude of the flow velocity, V, the density of the fluid, $\rho$, the viscosity of the fluid, $\mu$, and the angle made by the flow to the Disk 1 normal, $\alpha_1$. In non-dimensional form, this information may be expressed as $(c_p)_1 = f(Re_D, \alpha_1)$ where f is some function, $c_p = \Delta p/(0.5\ \rho V^2)$ is the pressure coefficient, and $Re_D = \rho VD/\mu$ is the Reynolds number based on disk diameter. Similarly, for the second disk, $(c_p)_2 = f(Re_D, \alpha_2)$ (It has been assumed here that the wake of one disk has negligible impact on the flow about the second disk, which will be the case unless $\alpha_1$ is nearly $\pm 90°$. If $\alpha_1 = 90°$ then the wake of Disk 1 will be quite small, and thus have a small impact on $(\Delta p)_2$. Similarly, if $\alpha_1 90°$ then $(\Delta p)_1 = 0$, a value that is unaffected by the wake of Disk 2, located upstream of it.) Now, since $\alpha_2 = (\pi/2) - \alpha_1$, if one measures the two pressure coefficients, one effectively has two equations to solve for the two unknowns: $Re_D$ and $\alpha_1$. Alternatively, one may consider a flow with some fixed viscosity and density about two disks of the same diameter. Then, $(\Delta p)_1 = g(V, \alpha_1)$ and $(\Delta p)_2 = g(V, (\pi/2) - \alpha_1)$, where g is some function, and again it is clear that by measuring $(\Delta p)_1$ and $(\Delta p)_2$ one has two equations in the two primitive variables V and $\alpha_1$.

As will be discussed below, owing to the one-to-one dependence of $(c_p)$ on $\alpha_1$ and $Re_D$ separately, the two equations described above may be solved readily, and yield a unique solution In particular, $$(\Delta p)_1 = \frac{1}{2} \rho \cdot V^2 f(Re_D, \alpha_1) \tag{1}$$

$$(\Delta p)_2 = \frac{1}{2} \rho \cdot V^2 f\left(Re_D, \frac{\pi}{2} - \alpha_1\right) \tag{2}$$

Dividing Equation 1 by Equation 2 yields a function h that depends on $\alpha_1$ and $Re_D$:

$$\frac{(\Delta p)_1}{(\Delta p)_2} = \frac{f(Re_D, \alpha_1)}{f(Re_D, (\pi/2) - \alpha_1)} = h(Re_D, \alpha_1) \qquad (3)$$

It turns out that h depends weakly on $Re_D$ and varies almost monotonically with $\Delta$. Using any reasonable initial guess for $Re_D$, it is possible to estimate the flow angle by measuring h. Equation 1 or 2 can then be used to determine the airspeed V, which can be used to calculate $Re_D$. Flow angle and speed are then refined. This procedure converges in one iteration Extension of this method to three-dimensional flows measured by three orthogonal disks is fairly straightforward because the pressure coefficient for each disk exhibits a "cosine-like" variation with $\alpha$.

EXAMPLES

Figure 8:
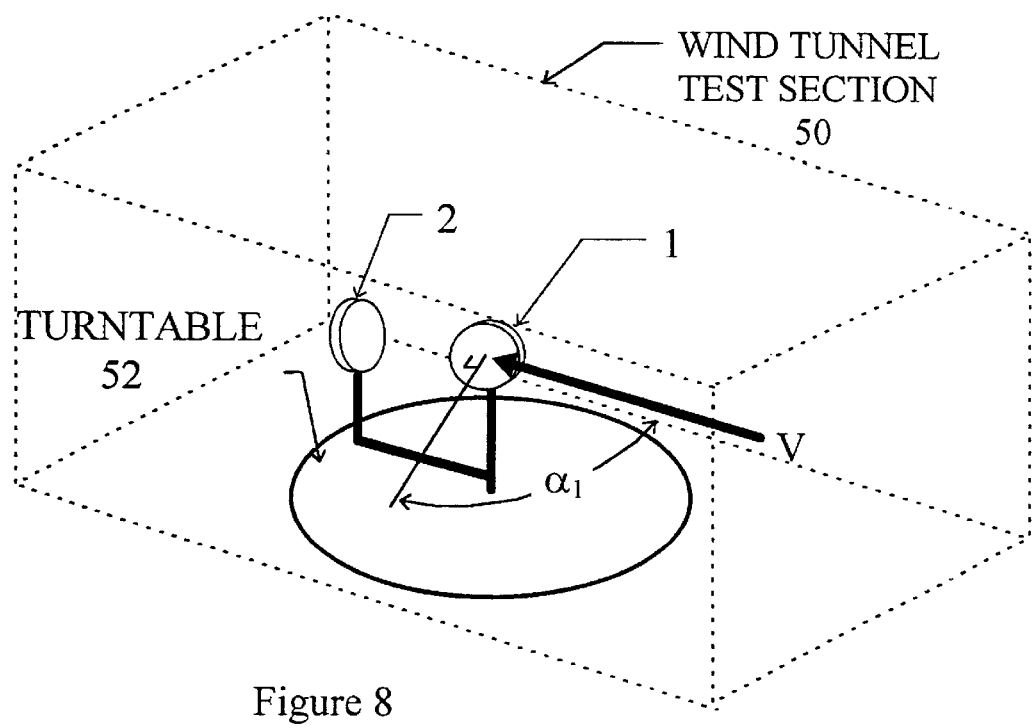
FIG. 8 schematically illustrates the set up of a pair of disks for wind tunnel tests of the probe.

A two-dimensional version of the multiple disk probe containing disks 1 and 2 was mounted on a turntable 52 in a wind tunnel 50 (FIG. 8). The turntable 52 is fitted with a lead screw (not shown) that allows one to adjust the turntable angle to an accuracy of 0.1°. The two disks, each of diameter D=2.54 cm and thickness t=0.38 cm, were mounted with centers in the vertical center of the test section but horizontally offset by about 10 cm The test section of the wind tunnel is 69 cm high and 94 cm in breadth. For the work described here the freestream velocity did not exceed 12 m/s (27 mph), as the investigation was on the behavior of the probe in wind conditions that might be encountered in a traffic tunnel. The wind tunnel velocity was measured by a Betz manometer connected to pressure tap rings located at the test section and immediately upstream of the contraction section of the wind tunnel. A pitot-static tube confirmed the accuracy of the Betz manometer velocity measurements.

Initial tests were carried out with just a single disk mounted in the wind tunnel to explore the influence of disk geometry on disk pressure coefficient. Three different disk geometries were tested in turn: a square edged disk, a disk with both edges beveled to an angle of 30° ($\beta$30°, refer to FIG. 1), and a third disk with edges beveled at P=55°. Each disk was fitted with two pressure tap lines. Each pressure tap line is connected to one of two thin gauge, flush-mounted tubes (i.e., the tubes do not protrude above the disk surface) that terminate at surface pressure holes. These holes are 1.7 mm in diameter and 1 mm deep and are centered on either side of the disk (FIG. 3). The pressure tap lines on either side of the disk were connected to the two sides of an inexpensive differential pressure transducer (Microswitch model 160PC). The disks were mounted in the wind tunnel by means of long tapered rods of maximum diameter 3.3 mm, which were in turn connected to an aluminum L-beam bolted to the wind tunnel turntable.

Figure 10:
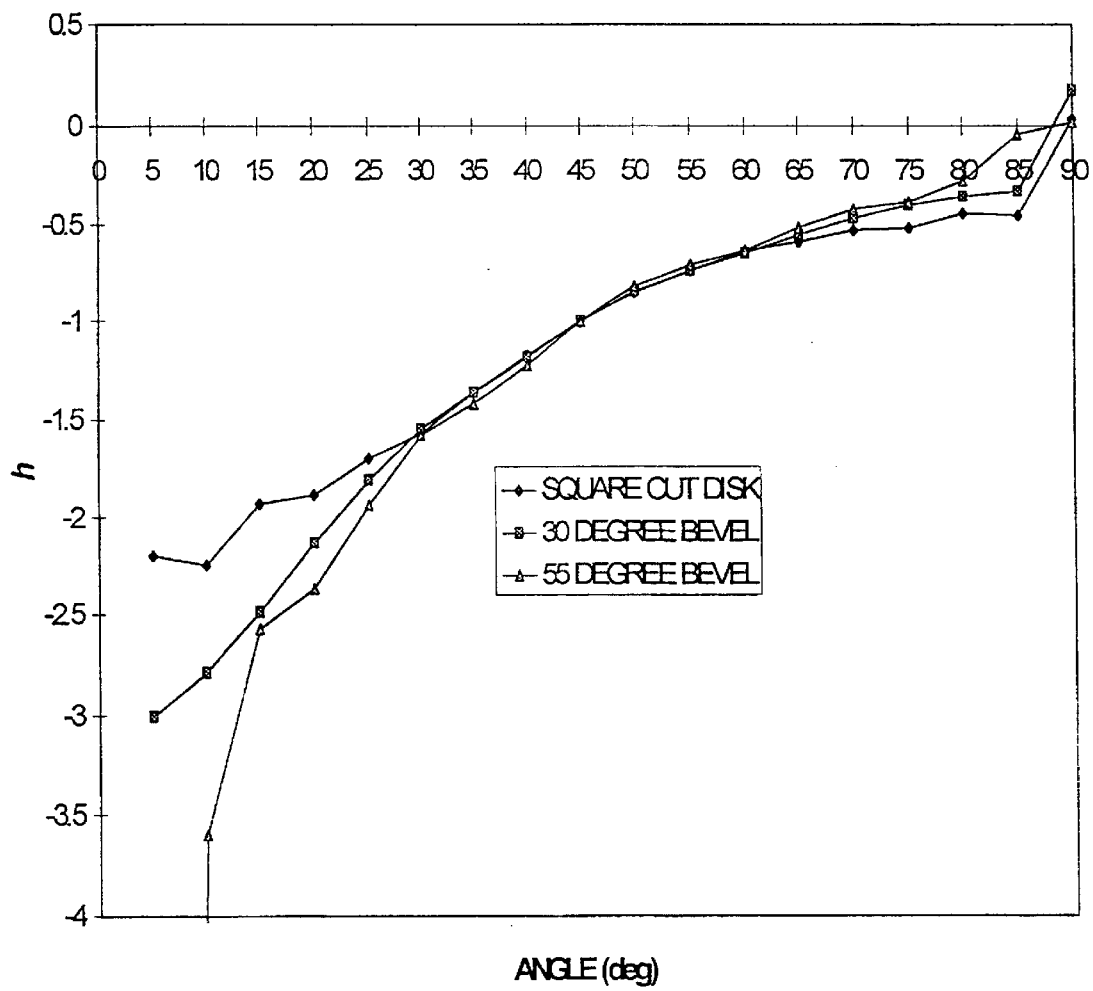
FIG. 10 is a plot illustrating the dependence of the disk pressure ratio for a two-disk anemometer, $h=\Delta p_1/\Delta p_2$, on the flow angle $\alpha_1$ (refer to FIG. 7) and the bevel angle, $\beta$. For these tests Re=11900.

As discussed in the Theory section, the ideal disk probe would have a pressure coefficient variation with ($\alpha_1$) such that $h(\alpha_1)$ (refer to Equation 3) is not merely one-to-one, but also has a large slope everywhere. Of the three disks studied, the disk with the 55° bevel best satisfies these requirements, having the largest mean slope and the least non-monotonic behavior (FIG. 10). Consequently, in the tests described subsequently, only the 55° bevel disk was used. Note that due to symmetry the behavior of a disk is completely characterized by its response to flow angles between 0° and 90°.

Figure 9:
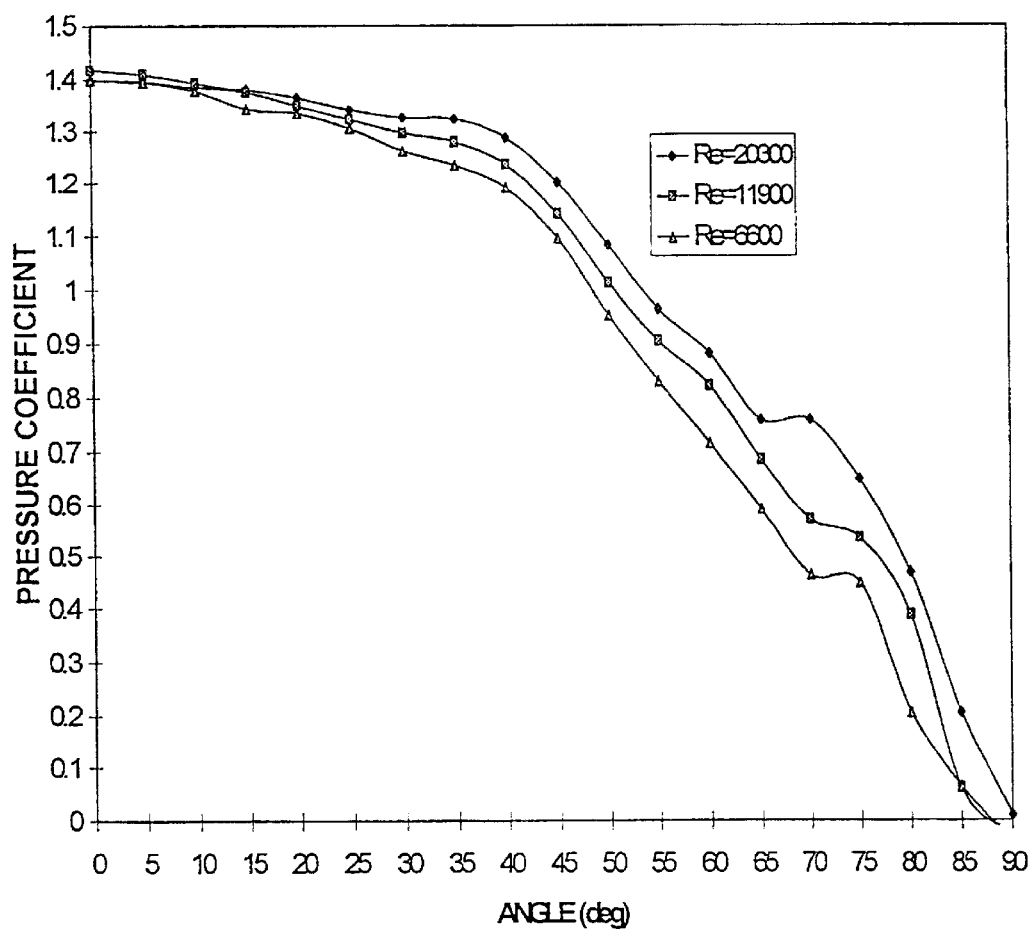
FIG. 9 is a plot illustrating the dependence of disk pressure coefficient, $c_p=\Delta p/(0.5 \rho V^2)$, on $\alpha$ and Reynolds number (Re=VD/v). $\Delta p$ is the pressure difference across the disk, $\rho$ is the fluid density, and v is the fluid kinematic viscosity, D is the disk diameter, and V is the fluid velocity. For these tests the disk diameter was 25 mm, the disk thickness was 3 mm, and the fluid was air at 23 Celsius.

All pressure coefficient curves have a "cosine-like" dependence on a. FIG. 9 shows the dependence of the pressure coefficient of a single disk on the Reynolds number, for Reynolds numbers of 6600, 11900, and 20300 (roughly, freestream velocities of 3.9 m/s, 7.1 m/s and 12.1 m/s). When the disk is within 15° of perpendicular to the flow, there is no dependence of the pressure coefficient on the Reynolds number. However, when the disk is at a larger angle to the flow, there is a significant pressure coefficient dependence on the Reynolds number (see, for example, FIG. 11). This dependence on Reynolds number causes h to vary from 2 (high $Re_D$) to 3 (low $Re_D$) for a=20°, at which angle it experiences its greatest percentage variation. In order to measure the flow direction and velocity, it is therefore necessary to use an iterative procedure. An intermediate Reynolds number is assumed, for which there is a prescribed curve of $h(\alpha_1)$. Having measured h one may calculate $\alpha_1$. Knowing $\alpha_1$, one then calculates V. This value of V allows one better to estimate the Reynolds number, and one then iterates with a different $h(\alpha_1)$ curve. One iteration results in convergence. In general, data inversion can be done in real time, using a lookup table to get angle from pressure ratio.

If one wishes to use the multiple disk probe for velocimetry, there should be good agreement between the flow velocity and angle measured by the probe and the true flow velocity and angle. With both disks mounted on the turntable, and the turntable at a prescribed angle, both the flow velocity and direction could be measured by independent means. These independent measurements of the flow are compared against the disk probe measurements in FIGS. 8 and 9.

Figure 12:
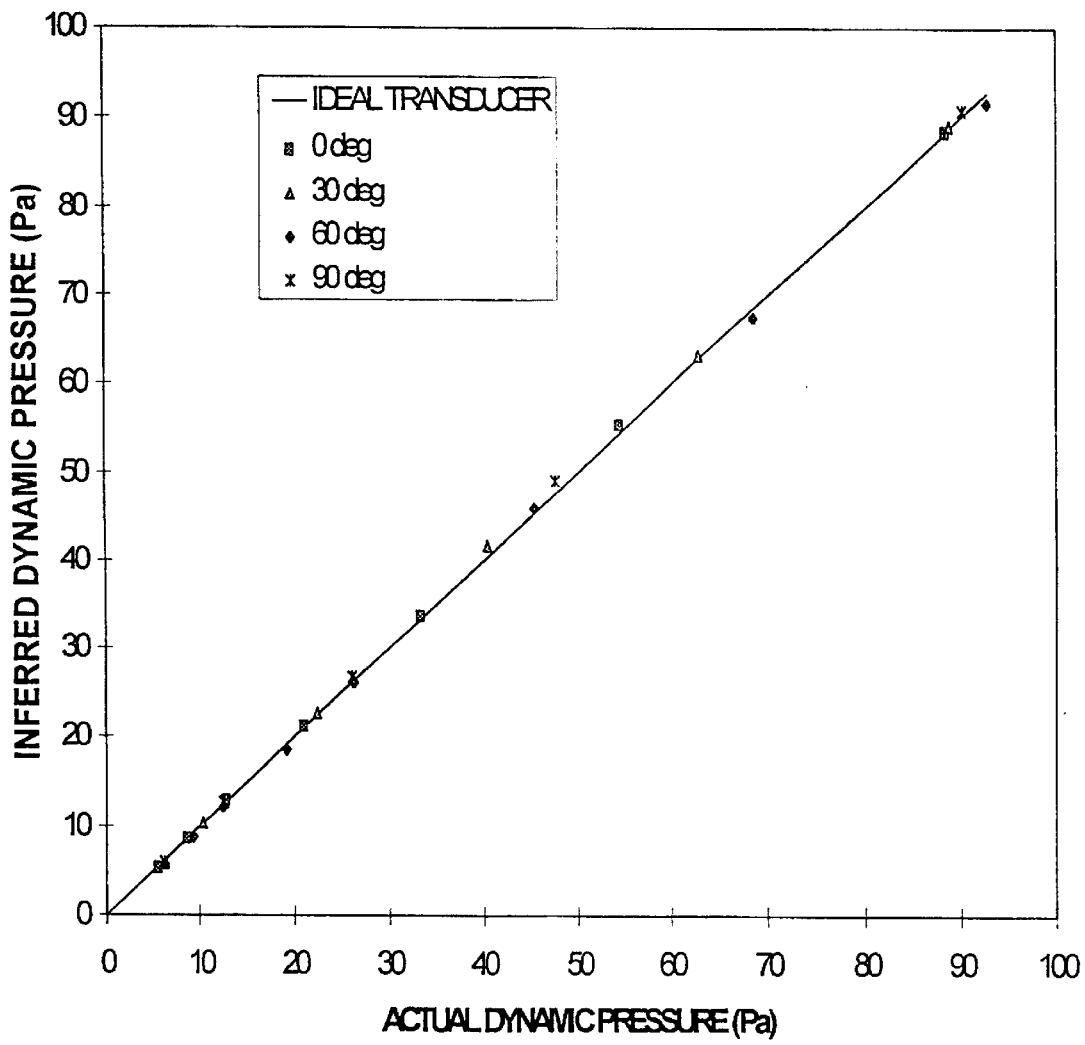
FIG. 12 is a plot illustrating the accuracy of the disk probe of the present invention for velocity magnitude determination.

FIG. 12 is a graph of the actual dynamic pressure in the wind tunnel airflow plotted against the dynamic pressure inferred from the disk probe pressures, for four different angles $\alpha_1$ of the flow relative to the disks (0°, 30°, 60°, and 90°. Angles between 90° and 360° gave identical results, owing to the symmetry of the disk probe). An ideal transducer would be plotted as a line of slope 1; the disk probe plots as a line of slope 1, but with an r.m.s. error of 2.8% (i.e., a velocity error of 1.4%). These errors result from interpolation of the ($\alpha_1$) curves and, to a lesser degree, transducer error and probe manufacturing tolerances.

Figure 13:
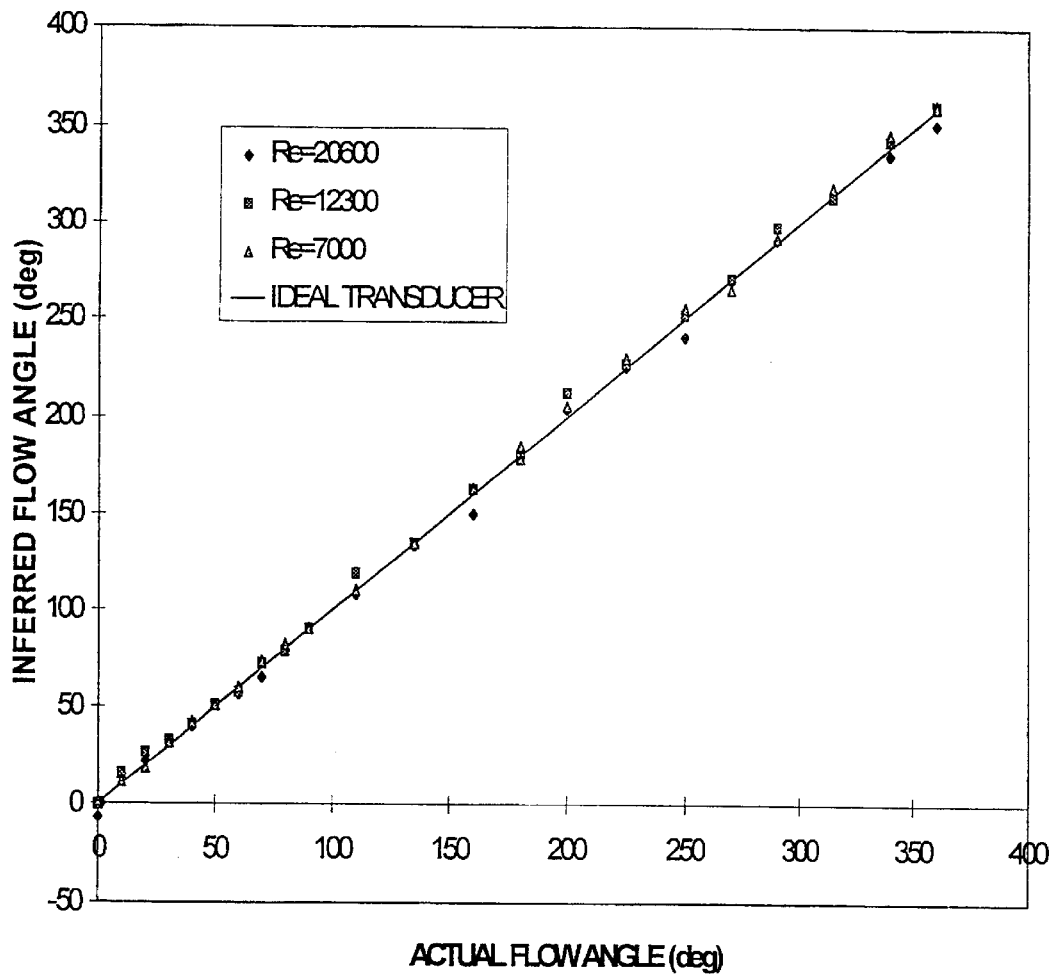
FIG. 13 is a plot illustrating the accuracy of the disk probe for flow angle determination.

FIG. 13 is a plot of the actual angle of the flow versus the angle inferred from the disk probe measurements, for three different flow Reynolds numbers. The disk probe differs from ideal behavior slightly, with an r.m.s. error of 4.1°. Virtually all the significant deviations from ideal behavior occur when either face of one of the disks is at an angle of 70° to the flow. If one eliminates these data from the error calculations, the r.m.s. angle error is under 2°.

Figure 11:
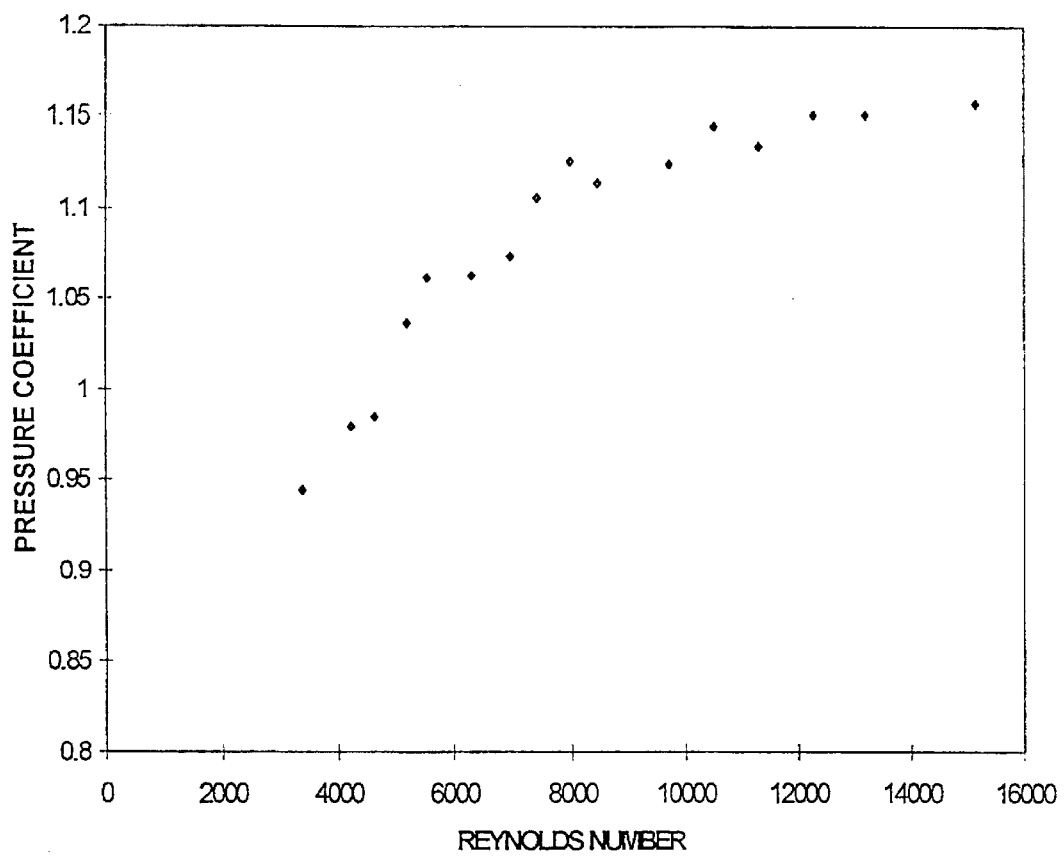
FIG. 11 is a plot illustrating the dependence of disk pressure coefficient on Re for a $\alpha=45°$.

In FIG. 9 it is shown that the 55° bevel disk has substantially better characteristics than the other two disk geometries tested. The superior behavior is most obvious when the disks are nearly parallel to the flow (i.e., $\alpha \cong 90°$), and is believed to be caused by the complex separation and reattachment of the flow when the plane of the disk is nearly aligned with the flow. However, even the 55° bevel disk has deficiencies. FIG. 10 shows that for 65<$\alpha$<75° the $c_p$ versus $\alpha_1$ curve has non-monotonic behavior, which results in an error in the determination of the angle. It is possible that a different disk edge geometry would have yielded more reliable measurements. Unfortunately, the judicious selection of a disk geometry requires a knowledge of the complex separation and reattachment characteristics of the three-dimensional flow around a disk at intermediate Reynolds numbers. This knowledge is presently lacking, and may be difficult to attain owing to the Reynolds number dependence of the flow. In this regard, it bears mention that when the disk is perpendicular to the flow ($\alpha$=0) the flow is Re independent above Re=7000, but when the disk is oriented at 45° to the flow $c_p$ increases with Re for Re<16000 (FIG. 11). The implication of this Reynolds number dependence is that the probe is generally more accurate at higher flow velocities.

The disk probe has been tested in a steady, uniform flow field. In general, the performance of the probe will deteriorate if the local velocity is different near the different disks. In practice, this will mean that the disk probe will not be suitable for investigating flows with length scales comparable to, or smaller than the disk spacing L. For similar reasons, we would not expect it to measure accurately unsteady flows with frequencies of the order V/L. Note that for the velocities used in the present work, V/L would be greater than 39 Hz. In fact, the response frequency of the pressure tap lines (also an issue for multi-hole probes) would be much less than this. For higher frequency fluctuations, the probe will average the pressure fluctuations in some sense, but the resulting averaged pressure and inferred velocity would be a biased (to high velocities) measurement of the true mean velocity.

Example 2

Sonic anemometers are commonly used for accurate measurements of three-dimensional wind velocity. The disk probe and one such sonic anemometer were compared in a variety of different conditions. Field tests were conducted in which the anemometers were mounted on a tower in an otherwise open field. The instruments were separated by approximately 1 meter horizontally and were positioned at an elevation of approximately 2.5 meters. Further testing was conducted in a Boundary Layer Wind Tunnel. In this series of tests the two devices were mounted symmetrically both inside the wind tunnel and outside the tunnel exit in the wake of a large obstruction (1.5 m wide×1 m long×0.5 m high).

The results from both sets of testing are outlined below. The comparison is divided into an analysis of wind speed, wind direction, and frequency response.

Wind Speed Measurements

Figure 14:
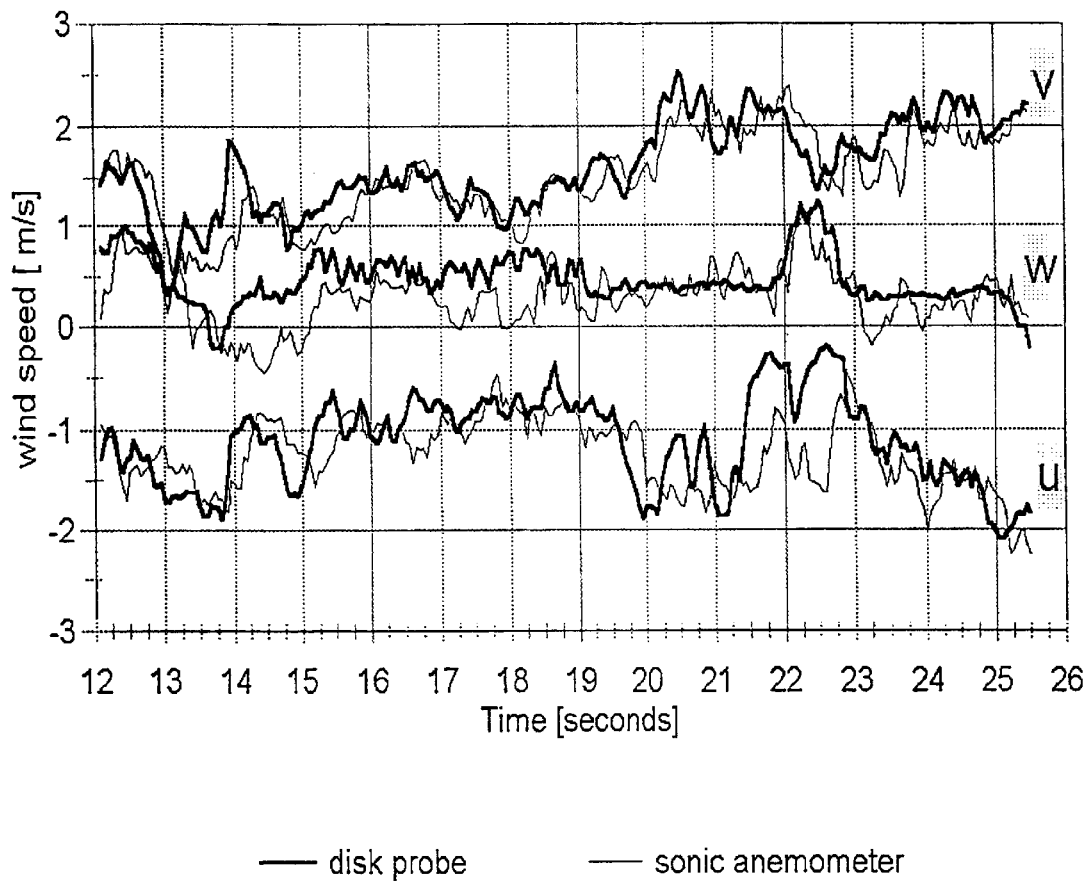
FIG. 14 is a plot of data generated over time.

From the field tests, a sample set of velocity measurements is shown in FIG. 14. The three velocity components, u, v, and we are shown for each device. The component u nominally relates to the north-south measurement, v to the east-west, and w to the vertical.

The correlation between the disk probe anemometer and sonic anemometer data is exceptionally good as the velocity components are very similar in each case. As the devices were separated by approximately I meter horizontally, it is not expected that there would be perfect agreement.

Each device experiences different small-scale fluctuations so only the general form of the measured response is expected to be the same. To put it another way, very low frequency fluctuations in the wind velocity tend to have a spatial extent larger than the device separation distance and thus yield similar measurements on the two instruments. On the other hand, high frequency fluctuations seen by each device are different and thus the measurements in the higher frequency portion of the spectrum will also be different. The analysis of the frequency response for each instrument is discussed further in following sections.

Figure 15:
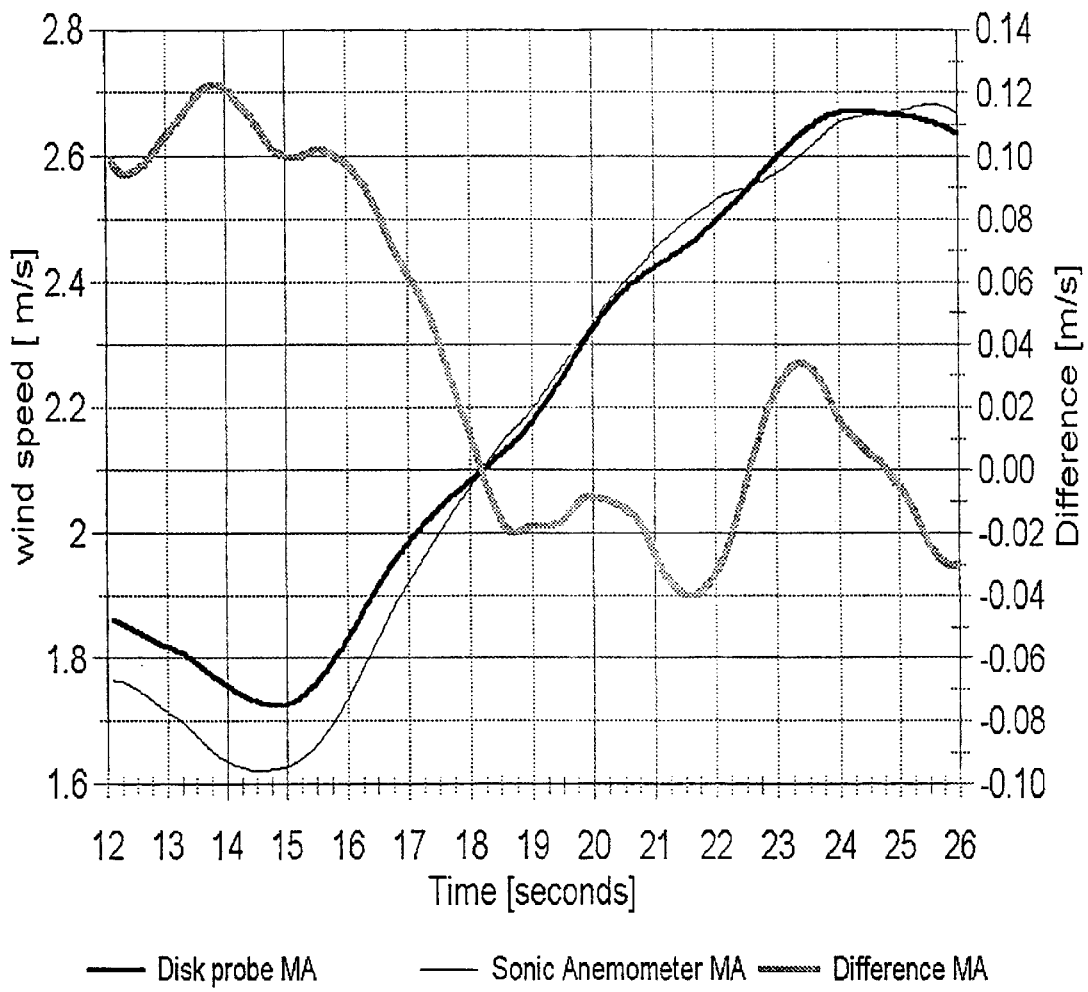
FIG. 15 is a plot of data generated over time using a moving average.

FIG. 15 shows the wind velocity magnitude from the data of FIG. 14. In this case, the data has been smoothed with a 25-point moving average. The difference between the wind velocity from the two devices is also shown (using the right-hand-side axis). The agreement between devices is quite good with the smoothed data. The largest difference is about 0.12 m/s and occurs between about 12 and 16 seconds on the time scale. Referring to FIG. 14, this difference can be explained to a large degree by the apparent phase difference in the measurements. To remove these fluctuations requires averaging over an even larger time interval.

Figure 16:
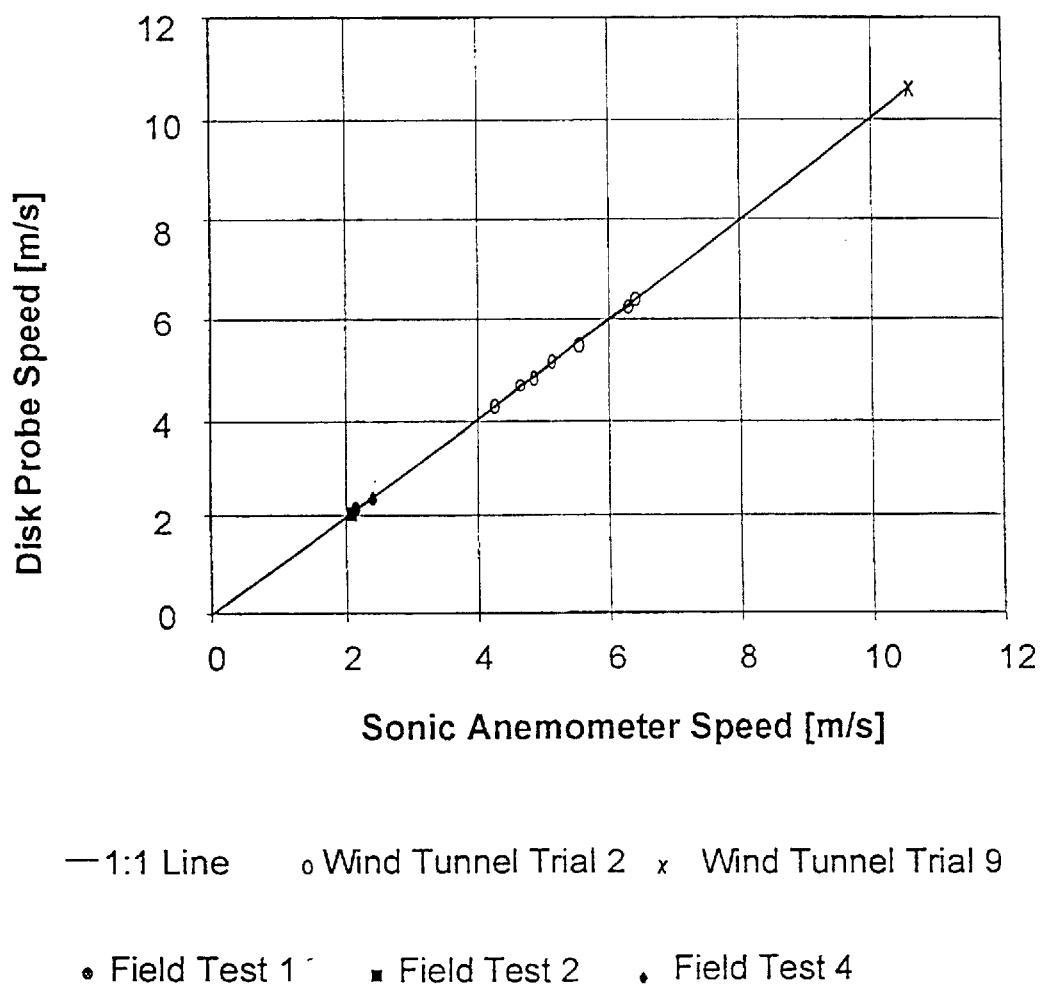
FIG. 16 is a plot of showing the speed correlation between the present invention and a sonic anemometer.

Using data from both the field tests and the wind tunnel tests, a more systematic evaluation of the speed measurements was developed. The results are shown below in FIG. 16 where disk probe measurements are plotted versus those of the sonic anemometer. Wind tunnel data from two trials was used. Wind Tunnel Trial 9 on the figure is a high velocity, constant speed test and Wind Tunnel Trial 2 uses segments from a test with continuously increasing wind speed. Field Test 1 uses the data from the field shown in FIGS. 14 and 15. This data, as with all other field test data, has been averaged over a long time to reduce spatially dependent fluctuations. Field Test 2 and Field Test 4 are drawn from similar data sets as Field Test 1.

Figure 17:
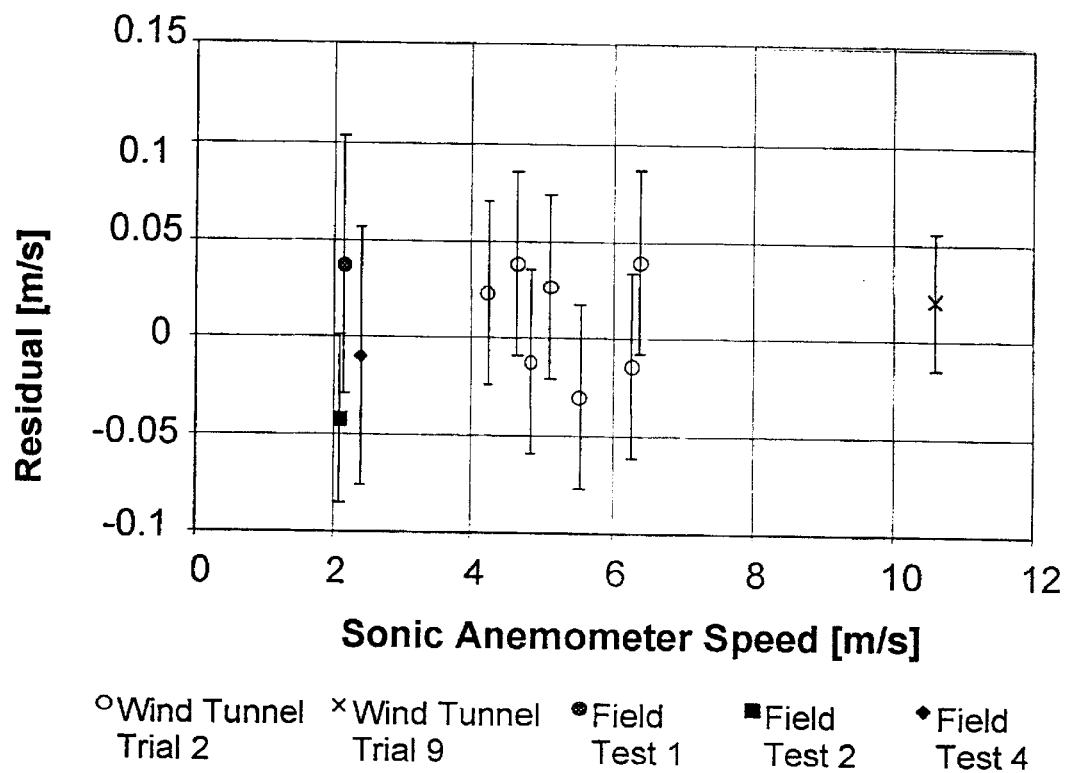
FIG. 17 is a plot illustrating the speed correlation between the present invention and a sonic anemometer presented in a manner different from that of FIG. 16.

In all cases, the wind speed measured with the disk probe device compares very well with that of the sonic anemometer. The difference between the two measurements is shown in FIG. 17. Error bars are shown using a 99% confidence estimate of the accuracy of the disk probe measured speed. In all cases, the disk probe and sonic anemometer measurements are equal within this experimental error.

Directional Measurements

Figure 18:
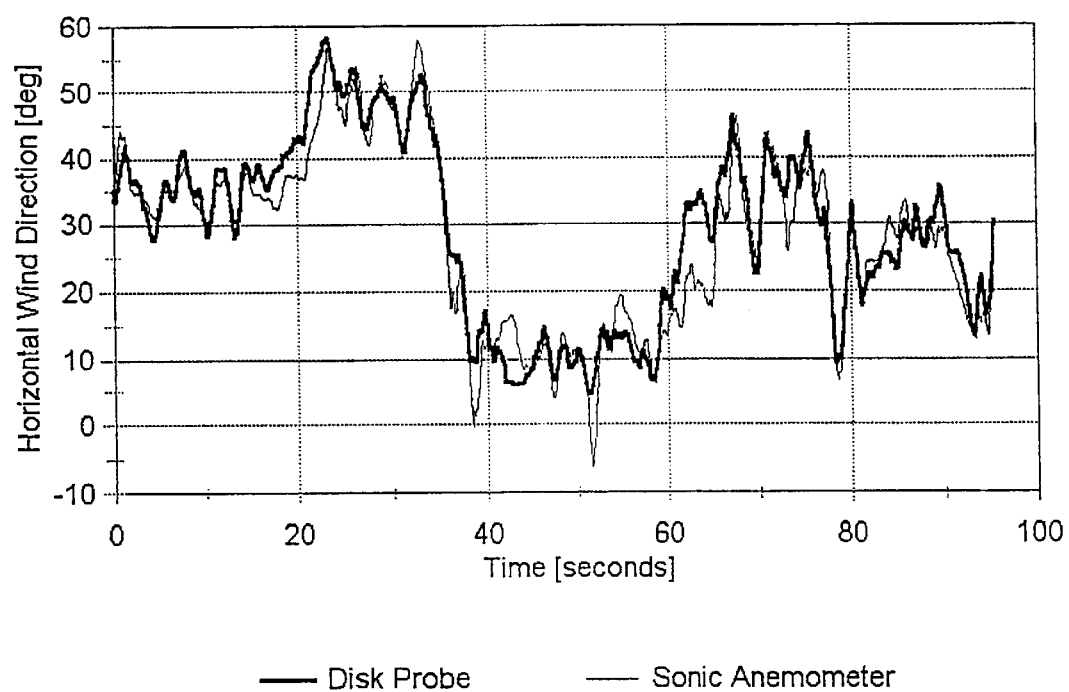
FIG. 18 is a plot illustrating the direction correlation between the present invention and a sonic anemometer.

Using the field test and wind tunnel data a comparison between the measured wind direction of the two instruments was made. FIG. 18 below shows time domain direction plots for the two devices over a 95 second interval of one on the field tests. There is again excellent agreement between the two devices, particularly considering the 1 meter separation distance.

Figure 19:
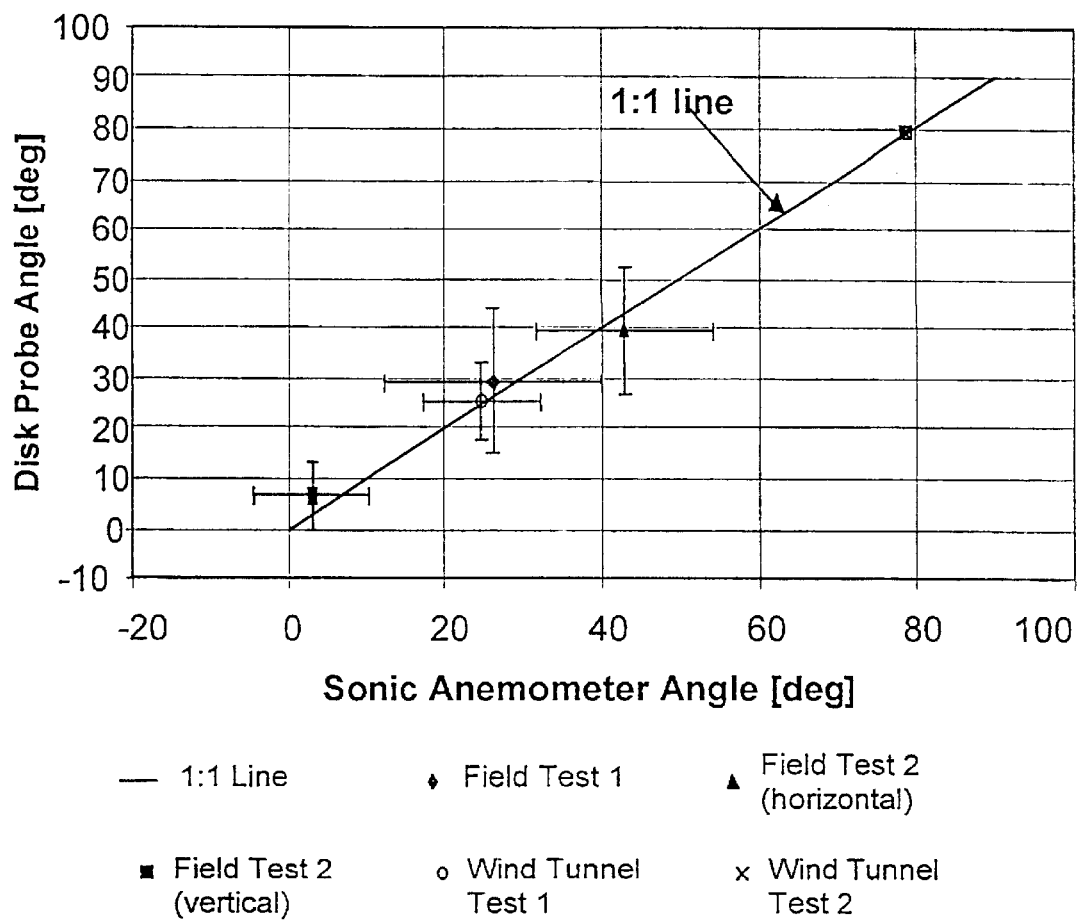
FIG. 19 is a plot illustrating the direction correlation between the present invention and a sonic anemometer presented in a manner similar to that of FIG. 16.

A direct comparison between the two instruments is shown below in FIG. 19. In this comparison, measured disk probe angles are plotted versus sonic anemometer angles. There are three field data points shown which are based on large time averages. Both the horizontal and vertical components are shown for Field Test 2. Two wind tunnel test points are included in the FIGURE; Wind Tunnel Test 1 used a large flow obstruction to cause a time variation in the wind direction and Wind Tunnel Test 2 was in uniform flow. The standard deviation in the measurements of both devices is shown with error bars. In all cases, the disk probe and sonic anemometer measurements agree within one standard deviation.

Frequency Response

The frequency response of both devices was evaluated using the discrete-time Fast Fourier Transform (FFT). The FFT was applied to various sets of data for each instrument and resulted in a frequency spectrum Without knowledge of the exact nature of the incoming flow to each device it was not possible to develop a true frequency response spectrum Rather, only the output response spectrum to a particular wind 'input' can be determined; for the comparison study of this report, this is sufficient.

Figure 20:
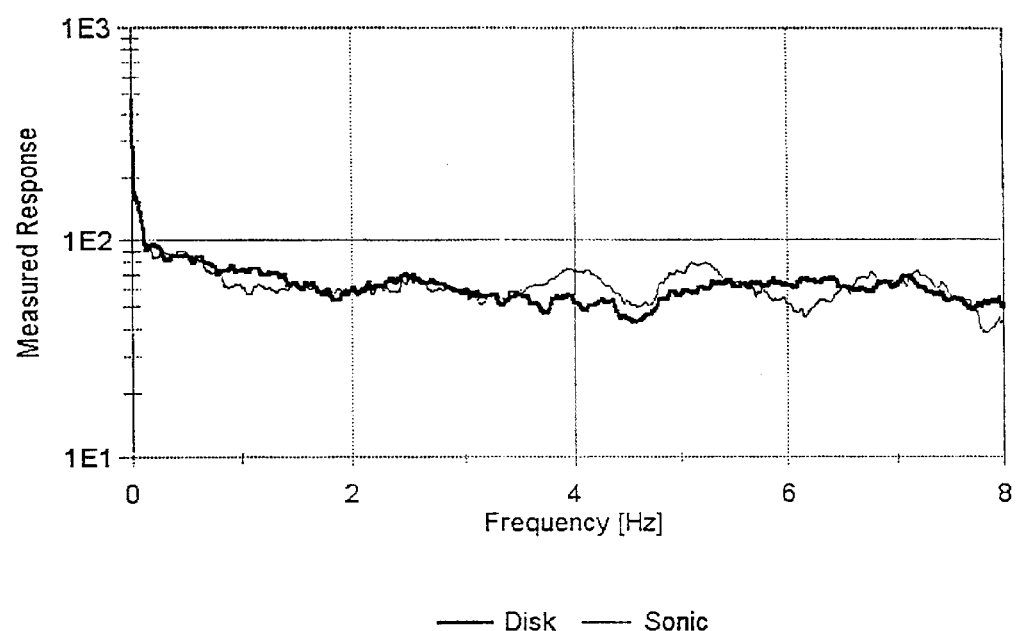
FIG. 20 is a plot illustrating the correlation of frequency response between the present invention and a sonic anemometer.

FIG. 20 below shows a typical FFT output from the wind tunnel tests for these instruments. The anemometers were located symmetrically downstream of a large rectangular obstruction in the wind tunnel. The obstruction generated a wake with velocity-dependent frequency characteristics. In this test, the wind speed was cycled up and down to create a range of different fluctuations in velocity at the anemometer locations.

As shown in FIG. 20, the frequency responses of the two instruments to this condition are essentially the same. The static measurement capabilities (0 Hz) of these devices are almost identical and there is very little difference in the responses up to even 8 Hz. Data are not shown above 8 Hz as with the sample rate used (40 Hz), data is too course to accurately resolve higher frequencies with FFT analysis.

It should be noted that the frequency response of these devices was slightly different when using field data However, the wind tunnel data is believed to give a more realistic frequency comparison as both devices are known to experience very similar flow conditions, the data sampling rate was higher, and sampling times were longer.

In all cases, the disk probe anemometer is shown to perform comparably to the sonic anemometer. The measured wind speed and direction were equal with each instrument within experimental error. The output frequency response of the two devices was shown to be virtually identical over range from 0 to 8 Hz.

Further Embodiment

Figures 21, 22:
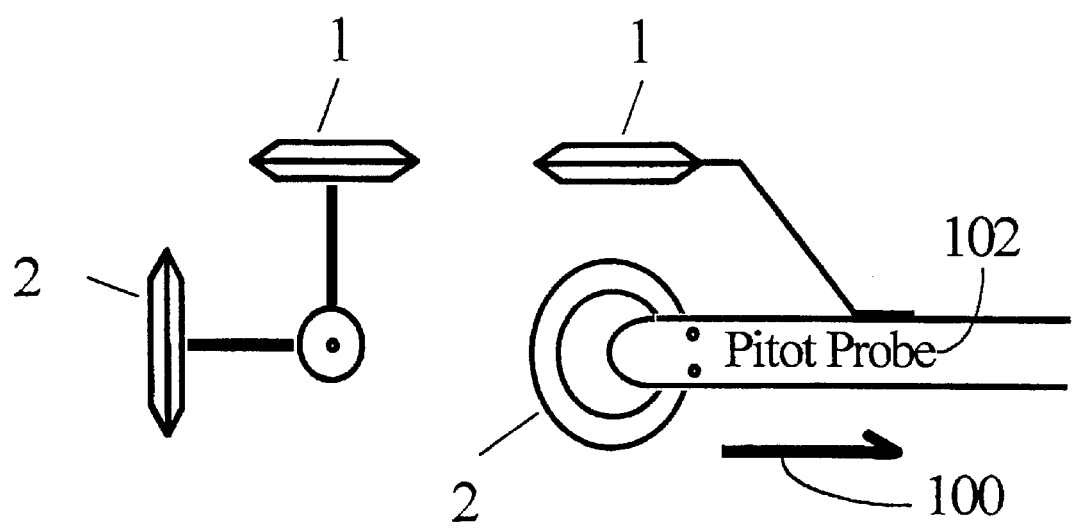
FIG. 21 is an end view showing another form of the invention wherein a pair of disks are arranged to function in conjunction with a pitot-static probe.
FIG. 22 is a side view of the device shown in FIG. 21.

Many practical flows, such as the flow relative to a fast-moving vehicle, have one dominant velocity component as indicated at 100 in FIG. 22. In such cases, the arrangement of the disks can be very compact because the approximate orientation of the disk wakes is known. Furthermore, two disks say disks 1 and 2 may be combined with a conventional Pitot probe 102 to form a compact, low-drag anemometer capable of measuring all 3 velocity components. Such a probe is shown in FIGS. 21 and 22. The optimal size and relative spacing of the disks would vary with the average fluid speed and the expected directional deviations.

Having described the invention modification will be evident to those skilled in the art without departing from the spirit of the invention as defined in the appended claims.

We claim:

1. A device for measuring fluid flow velocity comprising a plurality of substantially circular disks each having a diameter D and a pair of opposed side faces extending at an angle of less than 5° to each other, pressure sensor means positioned one on each of said pair of opposed faces in a location not more than $\frac{1}{10}$D from the center of its face of said pair of faces to sense pressure at said location thereby to provide a substantially symmetrical disk probe, and wherein said disks are arranged with said pair of faces of each of said disks substantially orthogonal to said pair of faces of each of the other disk of said plurality of disks and means to determine said fluid flow velocity based on pressure sensed by said pressure sensor means.

2. A device as defined in claim 1 wherein each said disk has a diameter D greater than 3 mm.

3. A device as defined in claim 2 wherein each said disk has a diameter of between 3 to 40 mm.

4. A device as defined in claim 2 wherein said disk angle is less than 1°.

5. A device as defined in claim 3 wherein said side faces are connected by a beveled edge symmetrical relative to said pair of opposed faces.

6. A device as defined in claim 5 wherein said beveled edge is defined by bevel surfaces extending at bevel angle β in the range of 45 to 80°.

7. A device as defined in claim 4 wherein said side faces are connected by a beveled edge symmetrical relative to said pair of opposed faces.

8. A device as defined in claim 1 wherein said device comprises two said disks.

9. A device as defined in claim 1 wherein said device comprises three said disks.

10. A device as defined in claim 1 wherein said spacing between said disks is at least 2 diameters D.

11. A device as defined in claim 5 wherein said spacing between said disks is at least 2 diameters D.

12. A device as defined in claim 1 wherein said spacing between said disks is at least 4 diameters D.

13. A device as defined in claim 5 wherein said spacing between said disks is at least 4 diameters D.

14. A device as defined in claim 2 wherein thickness t measured between said pair of opposed faces of the disk is at least 1 mm.

15. A device as defined in claim 5 wherein thickness t measured between said pair of opposed faces of the disk is at least 1 mm.

16. A device as defined in claim 2 wherein thickness t measured between said pair of opposed faces of the disk is between 2 and 30 mm.

17. A device as defined in claim 5 wherein thickness t measured between said pair of opposed faces of the disk is between 2 and 30 mm.

18. A device as defined in claim 3 wherein thickness t measured between said pair of opposed faces of the disk is between 2 and 30 mm.

19. A device as defined in claim 1 wherein said pressure sensor means comprises a pressure transducer and said means to determine said fluid flow velocity comprises a computer programmed to compute said fluid flow velocity and direction of flow of said fluid.

20. A device as defined in claim 5 wherein said pressure sensor means comprises a pressure transducer and said means to determine said fluid flow velocity comprises a computer programmed to compute said fluid flow velocity and direction of flow of said fluid.

21. A device as defined in any one of preceding claims 1 wherein said device comprises two of said disks arranged with said pair of faces of each of said disks substantially orthogonal to a longitudinal axis of a central pitot-static probe.

* * * * *